United States Patent
Tamaki et al.

(10) Patent No.: US 8,679,677 B1
(45) Date of Patent: Mar. 25, 2014

(54) INCORPORATION OF REFERENCE ELECTRODE INTO ELECTRODES OF ELECTROCHEMICAL DEVICE

(75) Inventors: Ryo Tamaki, Santa Clarita, CA (US); Mikito Nagata, Saugus, CA (US); Hisashi Tsukamoto, La Canada Flintridge, CA (US)

(73) Assignee: Quallion LLC, Sylmar, CA (US)

( * ) Notice: Subject to any disclaimer, the term of this patent is extended or adjusted under 35 U.S.C. 154(b) by 821 days.

(21) Appl. No.: 12/655,104

(22) Filed: Dec. 21, 2009

(51) Int. Cl.
  *H01M 4/02* (2006.01)
  *H01M 4/13* (2010.01)
  *H01M 4/72* (2006.01)
  *H01M 4/66* (2006.01)

(52) U.S. Cl.
  USPC ......... 429/209; 429/231.5; 429/234; 429/245

(58) Field of Classification Search
  USPC ................. 429/61, 92, 209, 231.95
  See application file for complete search history.

(56) References Cited

U.S. PATENT DOCUMENTS

| | | | |
|---|---|---|---|
| 6,376,124 B1 * | 4/2002 | Dodgson et al. | 429/127 |
| 2006/0286458 A1 * | 12/2006 | Sato et al. | 429/231.95 |
| 2009/0104510 A1 * | 4/2009 | Fulop et al. | 429/50 |

* cited by examiner

*Primary Examiner* — Ula C Ruddock
*Assistant Examiner* — Osei Amponsah
(74) *Attorney, Agent, or Firm* — Gavrilorich, Dodd & Lindsey, LLP

(57) ABSTRACT

The electrochemical device includes a composite electrode. The composite electrode has a working electrode that includes a current collector. A reference electrode is immobilized on the current collector. The reference electrode includes a reference active medium on a reference current collector. The reference current collector is electrically insulated from the current collector. A top surface of the reference electrode is substantially flush with a top surface of the working electrode. The top surface of the reference electrode is a surface of the reference electrode that is substantially parallel to the reference current collector.

20 Claims, 10 Drawing Sheets

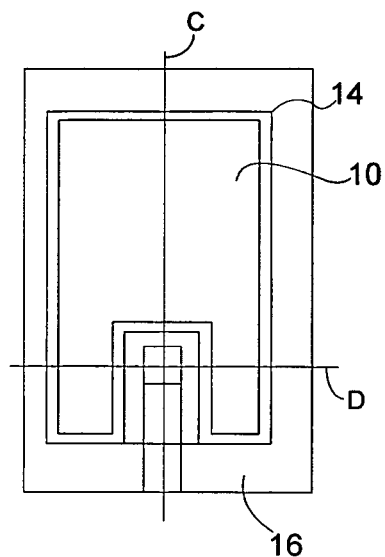
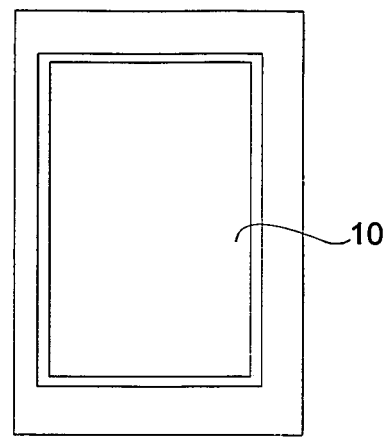
Figure 1A
Figure 1B
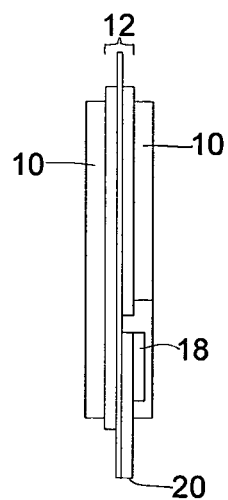
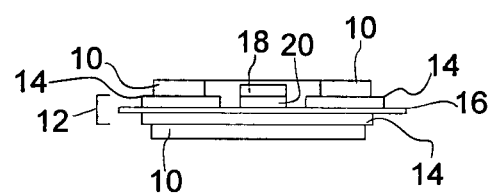
Figure 1C
Figure 1D

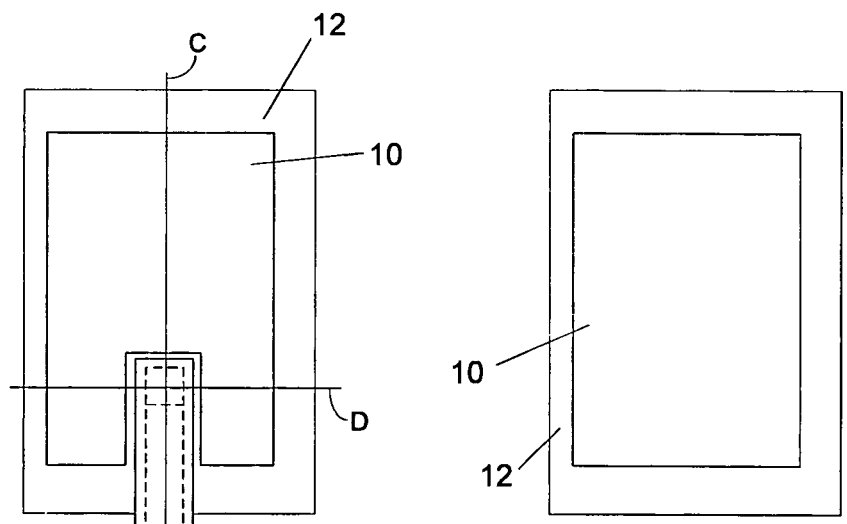
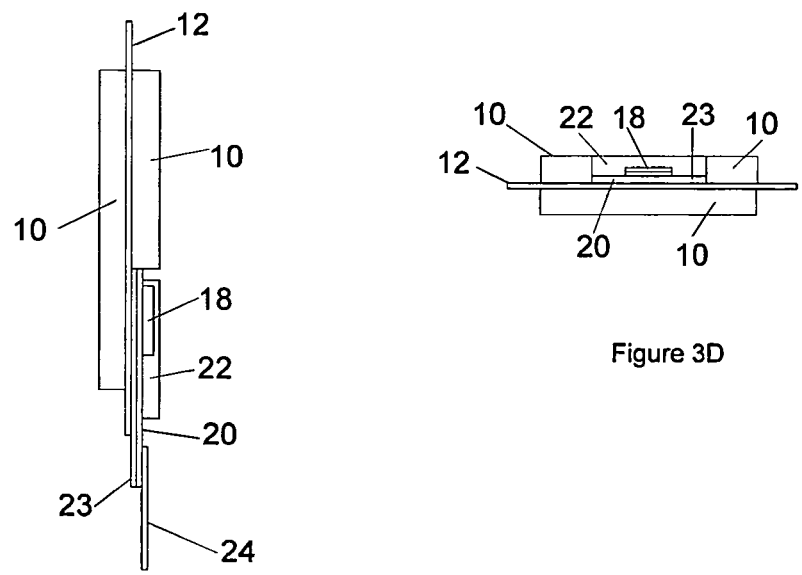
Figure 3A
Figure 3B
Figure 3C
Figure 3D

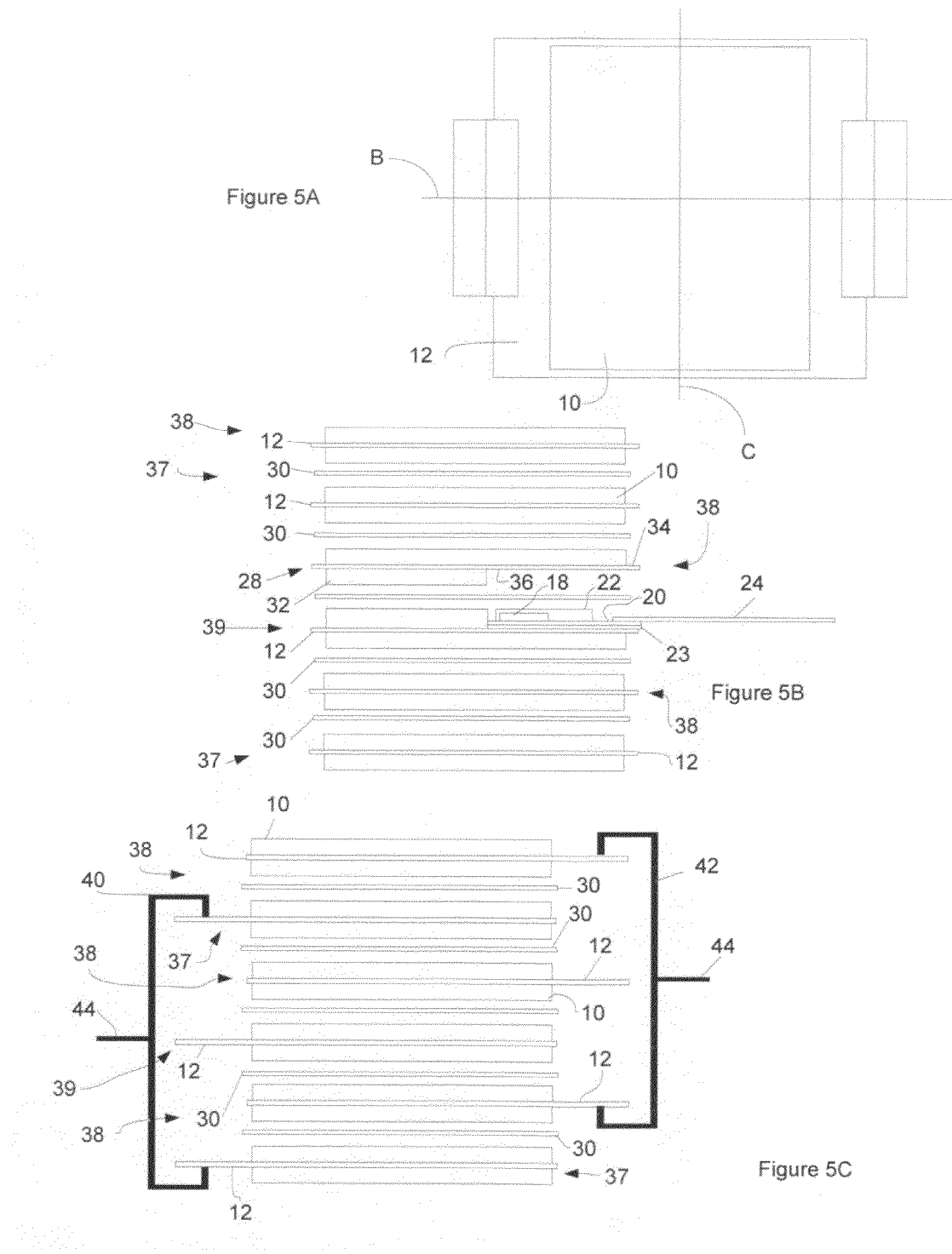

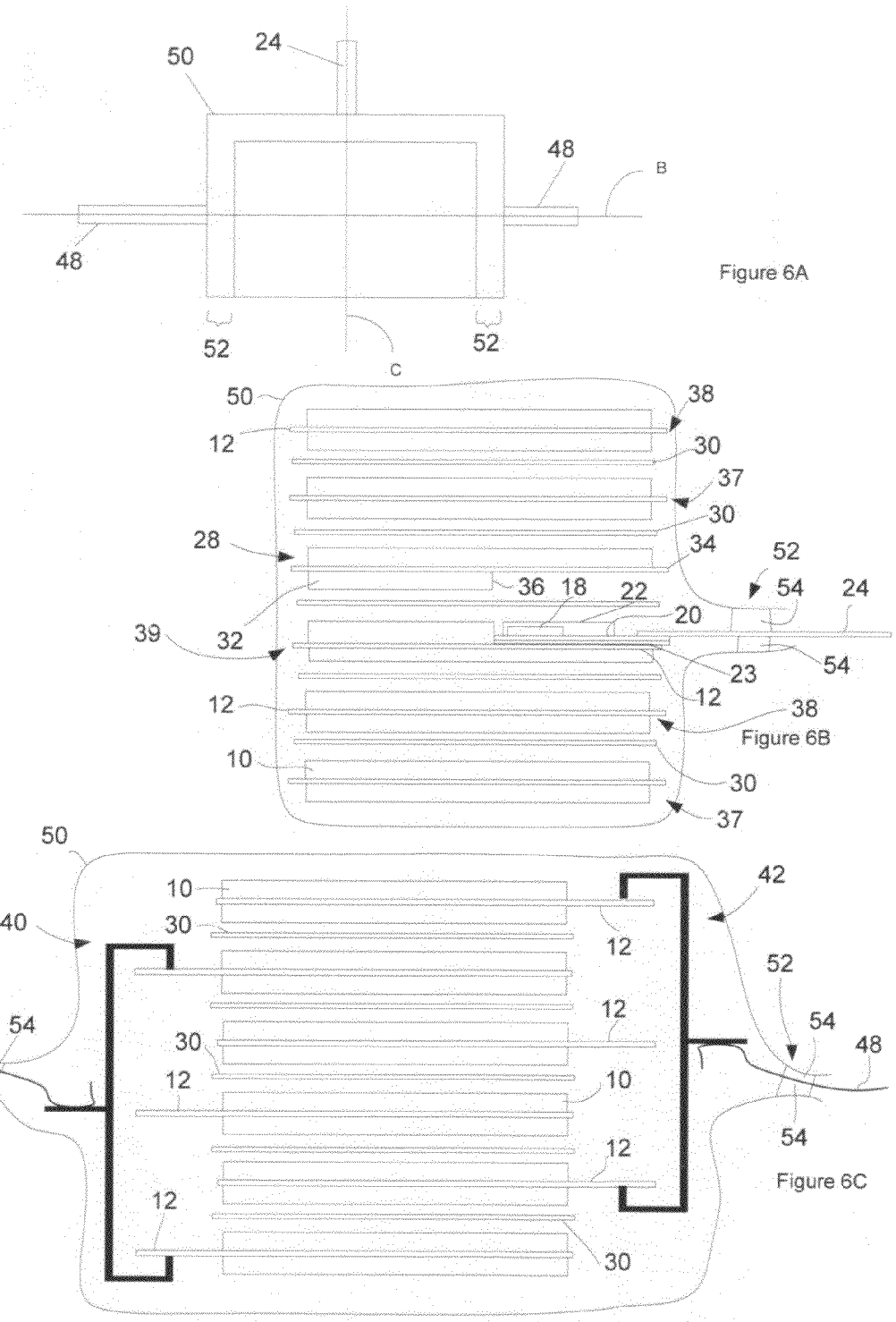

INCORPORATION OF REFERENCE ELECTRODE INTO ELECTRODES OF ELECTROCHEMICAL DEVICE

FIELD

The present invention relates to power sources and more particularly to batteries.

BACKGROUND

It is often desirable to monitor the potential of different electrode in the battery. For instance, if the voltage of different electrodes is known, it is often possible to identify whether failure of a battery is being caused by the positive electrode or the negative electrode.

The voltage of the battery does not indicate the potential of different electrodes since the battery voltage is the difference between the potentials of the positive and negative electrodes. As a result, it has been proposed to incorporate a reference electrode into these batteries. A reference electrode has a known potential that stays substantially constant during the operation of the battery. The potential of a particular electrode in the battery can then be determined by measuring the voltage between the electrode and the reference electrode and comparing the measured voltage to the known potential of the reference electrode.

Current efforts to incorporate a reference electrode into a battery have inserted a wire or other structure between the positive electrodes and negative electrodes in the battery. However, when the electrodes are wound or stacked, these reference electrodes deform the electrodes causing an uneven distance between adjacent electrodes. The different distances for ions to travel between the electrodes causes the performance of the battery to be unpredictable.

For the above reasons, there is a need for an improved battery having a reference electrode.

SUMMARY

The electrochemical device includes a composite electrode. The composite electrode has a working electrode that includes a current collector. A reference electrode is immobilized on the current collector. The reference electrode includes a reference active medium on a reference current collector. The reference current collector is electrically insulated from the current collector. A top surface of the reference electrode is substantially flush with a top surface of the working electrode. The top surface of the reference electrode is a surface of the reference electrode that has a distance from the reference current collector that is substantially constant and/or a distance from the current collector that is substantially constant and/or a distance from a collector support that is substantially constant. In some instances, the top surface of the reference electrode is the surface of the reference active medium.

In one example, the top surface of the reference electrode is about the same distance from a collector support or from the current collector as the distance of the top surface of the working electrode from the collector support or the current collector.

The electrochemical device includes a composite electrode. The composite electrode has a working electrode that includes a current collector. A reference electrode is built on the current collector. The reference electrode includes a reference active medium on a reference current collector that is electrically insulated from the current collector. A neighboring electrode is positioned adjacent to the composite electrode such that no other electrodes are positioned between the neighboring electrode and the composite electrode and such that the reference electrode is positioned between the current collector and the neighboring electrode. The neighboring electrode includes a neighboring active material on a neighboring current collector such that the neighboring active material is between the neighboring current collector and the working electrode without the neighboring active material being positioned between the reference electrode and the neighboring current collector.

In some instances, the neighboring active material is arranged such that a line that is perpendicular to a top surface of the reference active material can reach the neighboring current collector without passing through the neighboring active material.

BRIEF DESCRIPTION OF THE FIGURES

FIG. 1A through FIG. 1D illustrate a composite electrode that is suitable for use in an electrochemical device such as a battery. In FIG. 1A through FIG. 1D, the dashed lines illustrate the location of components that are located behind other components.

FIG. 1A is a sideview of the composite electrode taken looking at a face of the composite electrode. The composite electrode has a working electrode that includes a current collector. The current collector includes an electrically conducting collector layer on an electrically insulating collector support. A reference electrode is immobilized on the current collector. The reference electrode includes a reference active medium on a reference current collector.

FIG. 1B is sideview of the composite electrode taken looking at the composite electrode from the opposite direction of the direction shown in FIG. 1A.

FIG. 1C is a cross section of the composite electrode shown in FIG. 1A taken along the line labeled C.

FIG. 1D is a cross section of the composite electrode shown in FIG. 1A taken along the line labeled D.

In FIG. 2A through FIG. 2D, the dashed lines illustrate the location of components that are located behind other components.

FIG. 2A is a sideview of the composite electrode taken looking at a face of the composite electrode.

FIG. 2B is sideview of the composite electrode taken looking at the composite electrode from the opposite direction of the direction shown in FIG. 2A.

FIG. 2C is a cross section of the composite electrode shown in FIG. 2A taken along the line labeled C.

FIG. 2D is a cross section of the composite electrode shown in FIG. 2A taken along the line labeled D.

FIG. 3A is a sideview of a different embodiment of the composite electrode taken looking at a face of the composite electrode.

FIG. 3B is sideview of the composite electrode taken looking at the composite electrode from the opposite direction of the direction shown in FIG. 3A.

FIG. 3C is a cross section of the composite electrode shown in FIG. 3A taken along the line labeled C.

FIG. 3D is a cross section of the composite electrode shown in FIG. 3A taken along the line labeled D.

4A is a sideview of the face of the composite electrode that includes a reference electrode constructed according to FIG. 3A through FIG. 3D.

Figure 4A:
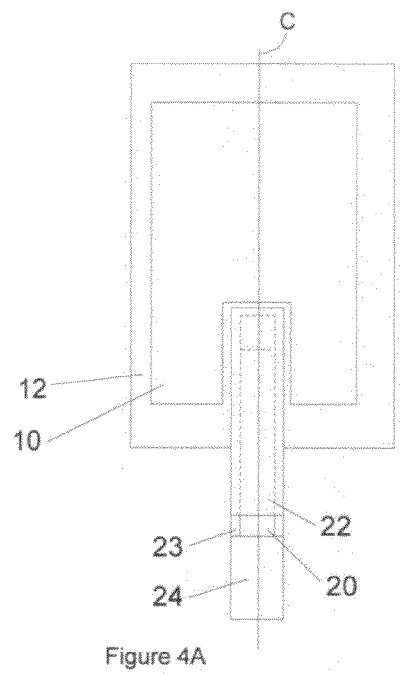
FIG. 4A through FIG. 4C illustrate an interface between the composite electrode and a neighboring electrode when the composite electrode is included in an electrode stack. FIG.
Figure 4B:
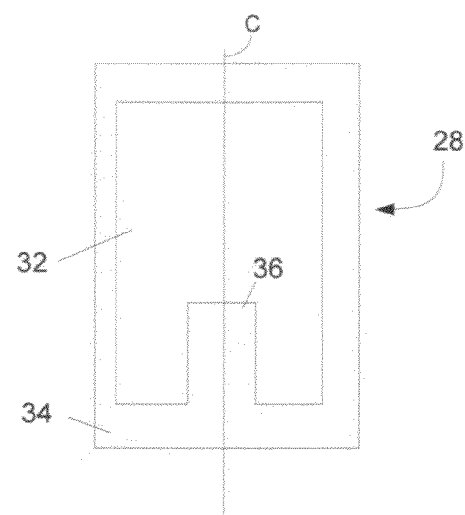

FIG. 4B is a sideview of a face of a neighboring electrode that will be adjacent to the reference electrode of a composite electrode included in an electrode stack.

Figure 4C:
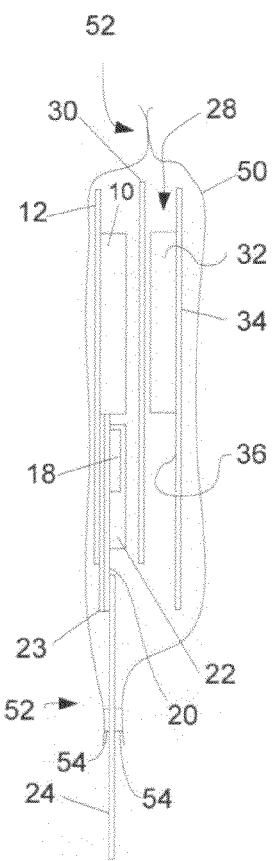

FIG. 4C is a cross section of a pouch cell that includes the composite electrode of FIG. 4A and the neighboring electrode of FIG. 4B arranged in a stack. The cross section of FIG. 4C is taken through the line labeled C in FIG. 4A and also through the line labeled C in FIG. 4B.

FIG. 5A through FIG. 5C illustrate an electrode assembly that includes a composite electrode. FIG. 5A is a topview of the electrode assembly.

FIG. 5B is a cross section of the electrode assembly shown in FIG. 5A taken along the line labeled B.

FIG. 5C is a cross section of the electrode assembly shown in FIG. 5A taken along the line labeled C.

Figure 5D:
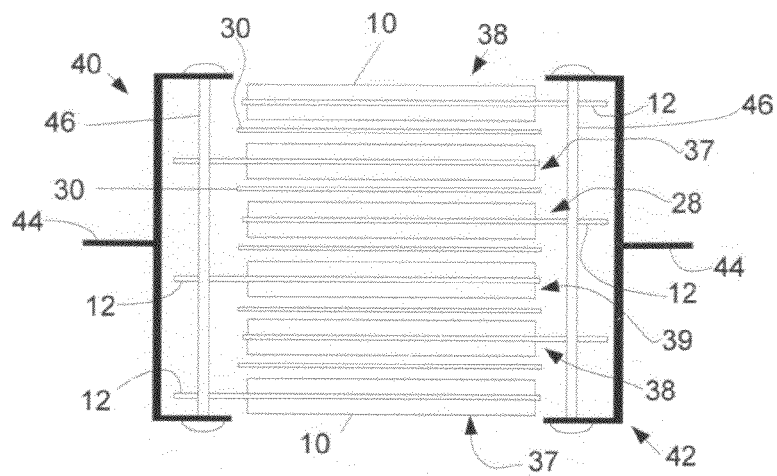
Figure 5E:
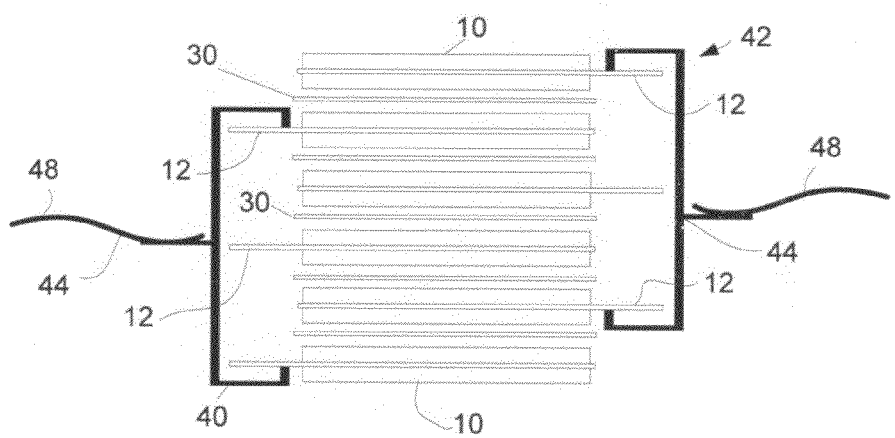
Figure 5F:
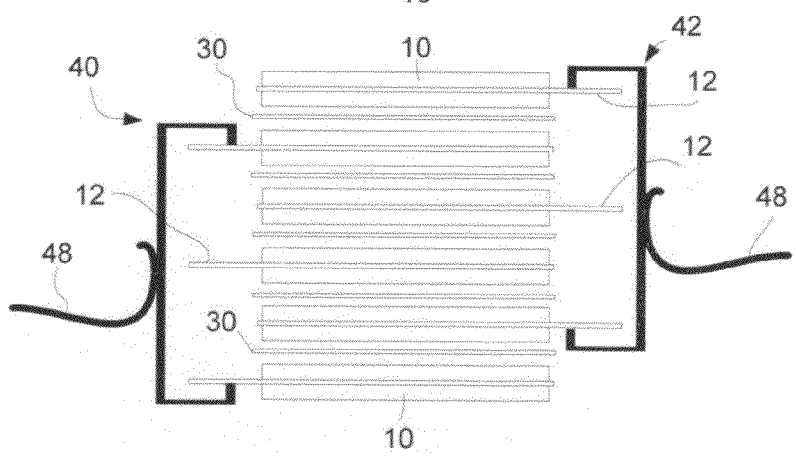

FIG. 5D through FIG. 5F illustrate electrical connectors for providing electrical communication between different electrodes in an electrode assembly.

FIG. 6A through FIG. 6C illustrate a battery including the electrode assembly of FIG. 5A through FIG. 5C. FIG. 6A is a topview of the electrode assembly.

FIG. 6B is a cross section of the electrode assembly shown in FIG. 6A taken along the line labeled C.

FIG. 6C is a cross section of the electrode assembly shown in FIG. 6A taken along the line labeled B.

FIG. 7A through FIG. 7F illustrate a method of forming a composite electrode according to FIG. 1A through FIG. 1D.

FIG. 8A through FIG. 8E illustrate a method of forming a composite electrode according to FIG. 2A through FIG. 2D.

FIG. 9A through FIG. 9G illustrate a method of forming a composite electrode according to FIG. 3A through FIG. 3D.

DESCRIPTION

A battery includes a composite electrode that has both a working electrode and a reference electrode positioned on a current collector. The working electrode can be a positive electrode or a negative electrode. As a result, the composite electrode can replace a positive electrode or a negative electrode in a stack of a roll of electrodes. The placement of the composite electrode into a stack or a roll of electrodes results in the reference electrode being placed directly into the stack or roll of electrodes.

The composite electrode can be constructed such that the top surface of the reference electrode is substantially flush with the top surface of the working electrode. As a result, replacing a positive electrode or a negative electrode in a stack of a roll of electrodes with the composite electrode does not substantially deform the electrodes in the stack from the shape or location that they would have had without the replacement. Accordingly, the composite electrode is not associated with the unpredictable performance that can result from inserting an additional reference electrode that is separately fabricated on a wire between the electrodes.

In the stack of a roll of electrodes a neighboring electrode will be positioned adjacent to the reference electrode. The neighboring electrode includes a neighboring active material on a neighboring current collector. The neighboring active material between the neighboring current collector and the reference electrode can be removed. If the neighboring active medium were present between the reference electrode and the neighboring current collector, lithium metal could deposit on the reference electrode or on the working electrode. Formation of this lithium metal in either of these locations could result in a catastrophic accident. As a result, the absence of the neighboring active material between the neighboring current collector and the reference electrode can enhance the performance of the battery.

FIG. 1A through FIG. 1D illustrate a composite electrode that is suitable for use in an electrochemical device such as a battery. FIG. 1A is a sideview of the composite electrode taken looking at a face of the composite electrode. FIG. 1B is sideview of the composite electrode taken looking at the composite electrode from the opposite direction of the direction shown in FIG. 1A. FIG. 1C is a cross section of the composite electrode shown in FIG. 1A taken along the line labeled C. FIG. 1D is a cross section of the composite electrode shown in FIG. 1A taken along the line labeled D. In FIG. 1A through FIG. 1D, the dashed lines illustrate the location of components that are located behind other components.

The composite electrode includes a reference electrode on a working electrode. The working electrode can be a positive electrode, a negative electrode, an anode, or a cathode. The working electrode includes an active medium 10 on both faces of a current collector 12. The active medium 10 includes or consists of one or more active materials. The current collectors 12 are each configured to provide an electrical pathway between the active medium 10 and the terminals of an electrochemical device. The current collector 12 includes or consist of a collector layer 14 on an electrically non-conducting collector support 16. As shown in FIG. 1A, the active medium 10 and collector layer 14 are patterned to define a reference electrode region where the reference electrode is positioned on the current collector 12 in a way that the reference electrode is electrically insulated from the current collector 12.

The reference electrode includes a reference active medium 18 on a reference current collector 20. The reference current collector 20 acts as a current collector 12 for the reference electrode. The reference active medium 18 includes one or more reference active materials. In some instances, the reference electrode includes a reference separator material 22. The reference separator material 22 can be electrically non-conducting while still permitting the reference active medium 18 to be exposed to the ions in an electrolyte. For instance, the reference separator material 22 can be porous and/or ion conducting. The electrically insulating nature of the collector support 16 and the reference separator material 22 keeps the working electrode and the reference electrode electrically isolated.

The illustrated reference separator material 22 is configured such that the top of the reference electrode is about the same distance from the collector support 16 as the top of the working electrode. As a result, the surface of the composite electrode has a substantially uniform thickness relative to the collector support 16. Accordingly, the reference electrode is not a source of uneven displacements between electrodes that are adjacent to one another in an electrode stack.

Although FIG. 1A through FIG. 1D illustrate the active medium 10 on both faces of the current collector 12, the active medium 10 and reference electrode can be positioned on only one face of the current collector 12. Alternately, the active medium 10 and reference electrode can be positioned on both faces of the electrode.

Figure 2A:
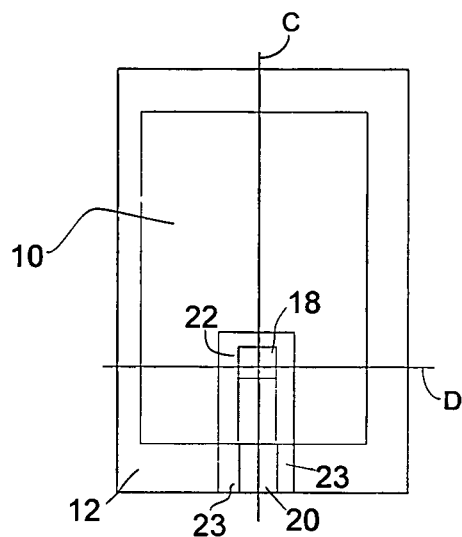
FIG. 2A through FIG. 2D illustrate a composite electrode constructed using an electrically conducting foil or substrate as the current collector.
Figure 2B:
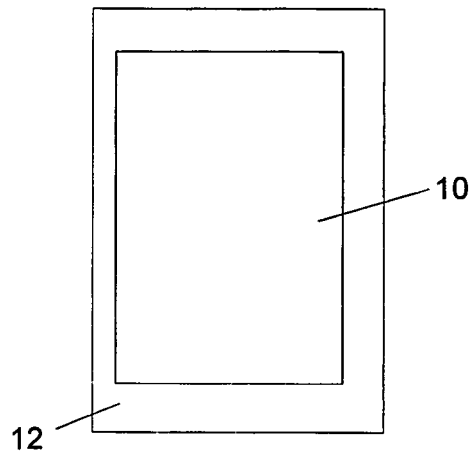
Figure 2C:
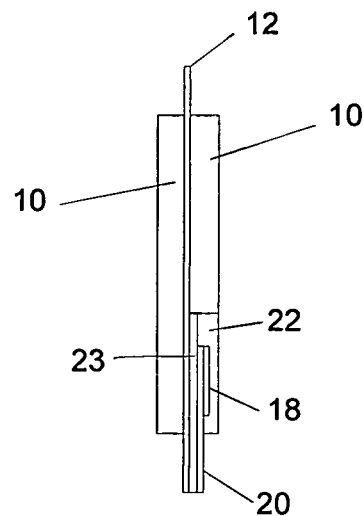
Figure 2D:
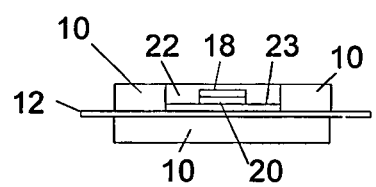

FIG. 2A through FIG. 2D illustrate a composite electrode constructed without the collector layer 14 and collector support 16. FIG. 2A is a sideview of the composite electrode taken looking at a face of the composite electrode. FIG. 2B is sideview of the composite electrode taken looking at the composite electrode from the opposite direction of the direction shown in FIG. 2A. FIG. 2C is a cross section of the composite electrode shown in FIG. 2A taken along the line labeled C. FIG. 2D is a cross section of the composite electrode shown in FIG. 2A taken along the line labeled D. In FIG. 2A through FIG. 2D, the dashed lines illustrate the location of components that are located behind other components.

The working electrode includes an active medium 10 on both faces of a current collector 12. As shown in FIG. 2A, the active medium 10 is patterned to define a reference electrode region where the reference electrode is positioned on the current collector 12. The current collector 12 can be constructed of one or more electrically conducting materials such as metals. For instance, the current collector 12 can consist of a substrate or foil that consists of one or more layers. Each of the layers can include or consist of an electrically conducting material. Although the active medium 10 is shown positioned on both faces of the current collector 12, the active medium 10 can be positioned on only one face of the current collector 12.

An electric insulator 23 is positioned between the current collector 12 and the reference electrode. The reference current collector 20 is located between the reference active medium 18 and extends out from under the reference active medium 18. In some instances, the reference electrode includes the electrically non-conducting reference separator material 22. The electrically insulating nature of the electric insulator 23 and the reference separator material 22 keeps the working electrode and the reference electrode electrically isolated from one another. The reference separator material 22 is configured to provide the surface of the composite electrode with a substantially uniform thickness relative to the current collector 12.

Although FIG. 2A through FIG. 2D illustrate the active medium 10 on both faces of the current collector 12, the active medium 10 and reference electrode can be positioned on only one face of the current collector 12. Alternately, the active medium 10 and reference electrode can be positioned on both faces of the electrode.

The electric insulator 23 and reference current collector 20 can extend beyond the perimeter of the current collector 12 as shown in FIG. 3A through FIG. 3D. FIG. 3A is a sideview of the composite electrode taken looking at a face of the composite electrode. FIG. 3B is sideview of the composite electrode taken looking at the composite electrode from the opposite direction of the direction shown in FIG. 3A. FIG. 3C is a cross section of the composite electrode shown in FIG. 3A taken along the line labeled C. FIG. 3D is a cross section of the composite electrode shown in FIG. 3A taken along the line labeled D. In FIG. 3A through FIG. 3D, the dashed lines illustrate the location of components that are located behind other components.

An electrode tab 24 can be connected to the reference current collectors 20 in the composite electrodes constructed according to FIG. 1A through FIG. 3D. For instance, FIG. 3A and FIG. 3C illustrate an electrode tab 24 connected to the reference current collector 20. The electrode tab 24 can be electrically conducting and the tab can be electrically connected to the current collector 12. As a result, the electrode tab 24 can act as a terminal for the electrochemical device or the tab can provide electrical communication between the terminal and the reference electrode.

Although FIG. 2A through FIG. 3D are disclosed in the context of a current collector 12 that is a foil or substrate of an electrically conducting material, the current collector 12 in a composite electrode constructed according to FIG. 2A through FIG. 3D can also be constructed according to FIG. 1A through FIG. 1D. For instance, the current collector 12 can include a collector layer 14 on a collector support 16 with the collector layer 14 patterned into the shape of the current collector 12 shown in FIG. 2A or FIG. 3A.

Suitable materials for the electrode tab 24 include, but are not limited to, nickel, aluminum, and stainless steel.

Suitable electric insulators 23 include, but are not limited to; aliphatic organic polymers such as polyethylene, polypropylene; aromatic polymers such as polycarbonate, polyimide, polyamide, polyketone, polyetherketone, polysulfone, polyethersulfone, and metal oxides such as silica, alumina, titania, zirconia. The electric insulator 23 can be formed on the current collector 12 by placing adhesive on the back of the electric insulator 23 or by coating a slurry that includes components for the insulator 23 on the current collector and drying the slurry or by coating an insulator slurry that includes polymer precursors for the electric insulator 23 on the current collector followed by polymerization.

Suitable reference separator materials 22 include, but are not limited to, porous materials including metal oxides, such as alumina, titania, silica, zirconia, metal nitrides or metal borates. In some instances, the reference separator material 22 is an ionically conductive material. Suitable ionically conductive materials include, but are not limited to, ceramics, germinates such as $Li_{(4-3x)}Al_xGeO_4$, wherein x=1 or 0; vanadates such as $Li_xV_2O_4$, wherein x=1~2; aluminates such as $Li_5AlO_4$; titanates such as $Li_2Zr_{(1-x)}Ti_xO_3$ wherein x=1 or 0, phosphates such as $Li_{1+x}M_x(Ge_{1-y}Ti_y)_{2-x}(PO_4)_3$ or $Li_{1+x'+y'}M'_{y'}T_{2-y'}Si_{x'}P_{3-x'}O_{12}$, wherein $0<x\leq0.8$, $0\leq y\leq1.0$, $0\leq x'\leq1.0$, $0\leq y'\leq1.0$, M represents one or more elements in the group consisting of In, Fe, Cr, Sc, Y, La, Ce, Pr, Nd, Sm, Eu, Gd, Th, Dy, H, Er, Tm, Yb, Lu, Al, B, N and Ga, and M' represents one or more elements in the group consisting of In, Fe, Cr, Sc, Y, La, Ce, Pr, Nd, Sm, Eu, Gd, Th, Dy, H, Er, Tm, Yb, Lu, Al, and Ga, phosphates such as $Li_{3+x}PO_{4-x}N_x$, x=0~1 or $(Li_2O)_x$—$BPO_4$, wherein x=0~2, and lithium sulfide such as $Li_2S$—$P_2S_5$. When the reference separator materials 22 is an ionically conductive material, the reference separator material 22 need not be a porous material. In addition to one or more of the porous materials and/or one or more of the ionically conductive materials, the reference separator material 22 can include a polymeric binders. Suitable polymeric binders include organic polymers such as poly(vinilidene fluoride) and metal oxides such as alumina.

The reference separator material 22 can be formed by generating a separator slurry that includes the one or more of the porous materials and/or one or more ionically conductive materials, polymeric binder, and a solvent. The separator slurry is coated on the desired location of the reference electrode and dried. For instance, the one or more solvents can then be evaporated from the separator slurry so as to leave the reference separator material 22 on the reference electrode. Suitable solvents include, but are not limited to, solvents having one or more components selected from a group consisting of 1-methyl-2-pyrrolidinone, N,N-dimethylformamide, and water.

The reference active medium 18 includes one or more reference active materials. Suitable reference active materials include, but are not limited to, lithium titanate ($Li_4Ti_5O_{12}$, LTO). Lithium titanate has a very stable potential at 1.55V (vs. Li/Li$^+$). Due to the relatively high potential, i.e. above 0.8V, the reduction of the surrounding media and the deposition of these on the surface and the change in the surface potential of LTO can be avoided. The LTO reference electrode, thus, enables precise reading of negative electrode and positive electrode separately. This result is in contrast to the use of lithium metal as the reference active material. Prior batteries have attempted to use lithium metal as the reference active material. However, lithium metal has one of the lowest redox potentials and can cause reduction of surrounding media. These reduced materials can deposit on the surface of the lithium metal and change the surface potential of lithium. The changing surface potential can make lithium metal undesirable for inclusion in a reference electrode.

Other suitable reference active materials include, but are not limited to, spinel type compounds that exhibit stable potential between 0 and 4V (vs. Li/Li$^+$) such as LiMn$_2$O$_4$, and LiMnO$_2$.

The reference active medium 18 can optionally include binders and/or conductors in addition to the one or more reference active materials. Suitable binders include, but are not limited to, poly(vinylidene fluoride) (PVDF), poly(tetrafluoro ethylene) (PTFE), poly(styrene-co-butadiene) rubber (SBR). Suitable conductors and/or diluents include, but are not limited to, carbon black, carbon nanotube and carbon fiber.

The reference active medium 18 can be formed by forming a reference slurry that includes the components of the reference active medium 18 and one or more solvents. The reference slurry is coated on one face of the reference current collector 20 or on both faces of the reference current collector 20. The one or more solvents can then be evaporated from the reference slurry so as to leave the reference active medium 18 on the current collector 12. Suitable solvents include, but are not limited to, solvents that include one or more components selected from a group consisting of: 1-methyl-2-pyrrolidinone, N,N-dimethylformamide and water.

Working electrodes according to FIG. 1A through FIG. 3D can be a negative electrode, an anode, a positive electrode, or a cathode. When the working electrode is a positive electrode or a cathode, the active medium 10 can be a positive active medium. When the working electrode is a negative electrode or an anode, the active medium 10 can be a negative active medium.

A suitable positive active medium includes or consists of one or more positive active materials. Suitable positive active materials include, but are not limited to, Li$_x$VO$_y$, LiCoO$_2$, LiNiO$_2$, LiNi$_{1-x}$Co$_y$Me$_z$O$_2$, LiMn$_{0.5}$Ni$_{0.5}$O$_2$, LiMn$_{(1/3)}$Co$_{(1/3)}$Ni$_{(1/3)}$O$_2$, LiFePO$_4$, LiMn$_2$O$_4$, LiFeO$_2$, LiMc$_{0.5}$Mn$_{1.5}$O$_4$, LiMn$_{1.5}$McO$_4$, vanadium oxide, carbon fluoride (CF$_{x''}$) and mixtures thereof wherein Me is Al, Mg, Ti, B, Ga, Si, Mn, Zn, Mo, Nb, V and Ag and combinations thereof, and wherein Mc is a divalent metal such as Ni, Co, Fe, Cr, Cu, and combinations thereof. In some instances, x is ≥1/3 before initial discharge of the battery and/or y is in a range of 7/3 to 3 before initial discharge of the battery and/or x' is ≥0 before initial discharge of the battery and/or 1−x'+y'+z'=1 and/or x" is ≥0 or x" is ≥0.2 before initial discharge of the battery. Example cathode materials include one or more lithium transition metal oxides selected from the group consisting of Li$_x$VO$_y$, LiCoO$_2$, LiNiO$_2$, LiNi$_{1-x}$Co$_y$Me$_z$O$_2$, LiMn$_{0.5}$Ni$_{0.5}$O$_2$, LiMn$_{0.3}$Co$_{0.3}$Ni$_{0.3}$O$_2$, LiFePO$_4$, LiMn$_2$O$_4$, LiFeO$_2$, LiMc$_{0.5}$Mn$_{1.5}$O$_4$.

The positive active medium can optionally include binders and/or conductors such as PVDF, graphite and acetylene black in addition to the one or more positive active materials. Suitable binders include, but are not limited to, PVdF, powdered fluoropolymer, powdered polytetrafluoroethylene or powdered polyvinylidene fluoride present at about 1 to about 5 weight percent of the positive active material. Suitable conductors and/or diluents include, but are not limited to, acetylene black, carbon black and/or graphite or metallic powders such as powdered nickel, aluminum, titanium and stainless steel.

When the working electrode is a positive electrode, the positive active medium can be formed on the current collector 12 by forming a positive slurry that includes the components of the positive active medium and one or more solvents. The positive slurry is coated on one face of the current collector 12 or on both faces of the current collector 12. The one or more solvents can then be evaporated from the positive slurry so as to leave the positive active medium on the current collector 12. Suitable solvents include, but are not limited to, solvents that include one or more components selected from a group consisting of 1-methyl-2-pyrrolidinone, N,N-dimethylformamide and water.

A suitable negative active medium includes or consists of one or more negative active materials. The negative active material can include or consist of a metal selected from Groups IA, IIA and IIIB of the Periodic Table of the Elements. Examples of these negative active materials include lithium, sodium, potassium, etc., and their alloys and intermetallic compounds including, for example, Li—Si, Li—Al, Li—B and Li—Si—B alloys and intermetallic compounds. Alternative suitable negative active materials include lithium alloys such as a lithium-aluminum alloy. The greater the amounts of aluminum present by weight in the alloy, however, the lower the energy density of the cell. Other suitable negative active materials include graphite or other carbon, silicon, silicon oxide, silicon carbide, germanium, tin, tin oxide, Cu$_6$Sn$_5$, Cu$_2$Sb, MnSb, other metal alloys, Li$_4$Ti$_5$O$_{12}$, silica alloys, or mixtures of suitable negative active materials.

The one or more negative active materials can include a carbonaceous mixture. For instance, the carbonaceous mixture can include two or more components selected from a group consisting of carbon beads, carbon fibers, and graphite flakes. The carbon beads can have shapes that approximate blocks, spheres, spheroids, cylinders, cubes or combinations of these shapes. The carbon beads may have a structure that is inherently rigid. Alternatively or additionally, the carbon beads may have a rigid surface layer that makes them difficult to deform. For instance, the carbon beads can have a rigid surface layer that includes hard carbon. Suitable carbon fibers can have a specific surface area of less than 5 m$^2$/g; an average particle size of less than 40 μm and preferably 10-35 μm; a d002 (layer distance) of less than 3.36 Å; and an Lc of greater than 100 nm. The graphite flakes can be natural or artificial graphite flakes. The graphite flakes can be softer than carbon beads.

In some instances, the negative active medium includes a binder. When a binder is used in the negative active medium, a suitable binders includes, but is not limited to, PVdF, PTFE, carboxymethyl cellulose (CMC), and styrene butadiene rubber (SBR). When the negative active material includes a carbonaceous mixture, the binder of the negative active medium can exclude fluorine, and can include carboxymethyl cellulose (CMC). In some instances, styrene butadiene rubber (SBR) is added to impart elasticity to the mixture.

When the working electrode is a negative electrode, the negative active medium can be formed on the current collector 12 by forming a negative slurry that includes the components of the negative active medium and one or more solvents. The negative slurry is coated on one face of the current collector 12 or on both faces of the current collector 12. The one or more solvents can then be evaporated from the negative slurry so as to leave the negative active medium on the current collector 12. When the one or more negative active materials include a continuous sheet of material such as lithium metal, the sheet of material can be formed on the current collector 12 by pressing the metal to a mesh or screen current collector.

As noted above, the current collector 12 can be constructed without a collector layer 14 and collector support 16. For instance, the current collector 12 can be a foil or substrate that includes one or more layers that are each an electrically conducting material. When the working electrode is a positive electrode or a cathode and the current collector 12 includes or consists of a foil or substrate, suitable current collectors 12 include, but are not limited to, aluminum, stainless steel, titanium, or nickel substrates. When the working electrode is a negative electrode or an anode and the current collector 12 includes or consists of a foil or substrate, suitable current collectors 12 include, but are not limited to, lithium metal, titanium, a titanium alloy, stainless steel, nickel, copper, tungsten, tantalum, and alloys thereof.

When the current collector 12 includes a collector layer 14 on a collector support 16, the collector layer 14 can include electrically conducting materials that can be applied to the collector support 16 in an ink. For instance, the collector layer 14 can be formed by applying a silver ink to the collector support 16. In this instance, the silver in the silver ink serves as the electrically conducting material. In some instances, the collector layer 14 includes or consists of carbon nanotubes that serve as the electrically conducting material. When the collector layer 14 includes carbon nanotubes that serve as the electrically conducting material, the current collector 12 is suitable for serving as the current collector 12 of a positive electrode, a cathode, a negative electrode, or an anode.

Carbon nanotubes are allotropes of carbon with a cylindrical structure. Carbon nanotubes can have an aspect ratio in a range of 28,000,000 to 1. Suitable carbon nanotubes for inclusion in the collector layer 14 include, but are not limited to single wall nanotubes (SWNT) and multiwall nanotubes (MWNT). Suitable diameter ranges for single wall nanotubes included in the collector layer 14 include, but are not limited to, 1 nm to 5 nm. Suitable diameter ranges for multiwall nanotubes included in the collector layer 14 include, but are not limited to, 5 to 100 nm. Suitable lengths for nanotubes included in the collector layer 14 include, but are not limited to, 100 nm to 100 micrometers.

The collector layer 14 can optionally include materials in addition to the carbon nanotubes. For instance, the collector layer 14 can optionally include materials such as binders, conductors and/or diluents. Suitable binders include, but are not limited to, poly(vinylidene fluoride) (PVDF), poly(tetrafluoro ethylene) (PTFE), poly(styrene-co-butadiene) rubber (SBR), and carboxymethyl cellulose (CMC). Suitable conductors and/or diluents include, but are not limited to, carbon black, carbon fiber, and carbon nanotubes. In some instances, the binders, conductors and/or diluents are present at less than 4 wt %, 20 wt % or 10 wt % of the total weight of the collector layer 14. As a result, the nanotubes can be greater than 60 wt %, 80 wt % or 90 wt %. Increasing the portion of carbon nanotubes in the collector layer 14 increases the portion of electrical current that is carried by the carbon nanotubes and accordingly increases the positive influence of the carbon nanotubes on the performance of the battery. As a result, the carbon nanotubes are preferably greater than 90 wt % of the collector layer 14.

The collector support 16 can have a variety of forms. For instance, the collector support 16 can be a continuous layer of material, a paper, a woven fabric, or a non-woven fabric. The collector support 16 can have a thickness greater than 0.01 µm, 0.1, or 1 µm and/or less than 50 µm, 100 µm, or 1000 µm. Suitable materials for the collector support 16 include, but are not limited to, polymers, metals, ceramics, and composites of these materials. Suitable polymers for inclusion in the collector support 16 include, but are not limited to, cellulose, aliphatic polymers such as polypropylene and polyethylene, aromatic polymers such as polycarbonate, polyimide, polysulfone, polyketone, conjugated polymers such as polythiophene, polyaniline, polyphenylene vinylene, cellulose, and copolymers of these polymers. Suitable metals for inclusion in the collector support 16 include, but are not limited to, copper, aluminum, nickel, stainless steel, titanium, platinum and alloys of these metals. Suitable ceramics for inclusion in the collector support 16 include, but are not limited to, silica, alumina, titania, zirconia, and composites of these ceramics. In one example, the collector support 16 is cellulose paper.

The collector layer 14 can be formed on the collector support 16 using printing techniques such as ink-jet printing, thermal transfer printing, offset and silk-screen printing. These techniques make use of inks that include one or more solvents and the carbon nanotubes and/or other electrically conducting materials such as silver. Additionally, the patterning of the collector layer 14 that results from the use of these techniques can eliminate the need to remove portions of the collector layer 14 after the formation of the collector layer 14. After printing, the printed ink can be dried to form the collector layer 14. Drying of the ink can include evaporation of the solvents from the ink.

FIG. 4A through FIG. 4C illustrate an interface between the composite electrode and a neighboring electrode 28 when the composite electrode is included in an electrode stack. FIG. 4A is a sideview of the face of the composite electrode that includes a reference electrode constructed according to FIG. 3A through FIG. 3D. FIG. 4B is a sideview of a face of a neighboring electrode 28 that will be adjacent to the reference electrode of a composite electrode included in an electrode stack. FIG. 4C is a cross section of a pouch cell that includes the composite electrode of FIG. 4A and the neighboring electrode 28 of FIG. 4B arranged in a stack. The cross section of FIG. 4C is taken through the line labeled C in FIG. 4A and also through the line labeled C in FIG. 4B.

As is evident from FIG. 4C, the composite electrode and the neighboring electrode 28 are stacked such that a separator 30 is located between the composite electrode and the neighboring electrode 28. When the separator 30 is located between the reference electrode and the composite electrode as shown in FIG. 4C, the reference separator material 22 may be optional. Suitable separators 30 include, but are not limited to, polyethylene, polypropylene and copolymer of these polymers.

The neighboring electrode 28 includes a neighboring active medium 32 on a neighboring current collector 34. The neighboring current collector 34 can be constructed according to FIG. 1A through FIG. 1D or FIG. 2A through FIG. 3D. When the neighboring electrode 28 is a positive electrode or a cathode, the neighboring active medium 32 is a positive active medium and when the neighboring electrode 28 is a negative electrode or an anode, the neighboring active medium 32 is a negative active medium. The neighboring active medium 32 is formed on the neighboring current collector 34 such that neighboring active medium 32 is not positioned between the reference electrode and the neighboring current collector 34. For instance, the neighboring active medium 32 includes a recess 36 that extends to the neighboring current collector 34. The recess 36 can extend all the way down to the neighboring current collector 34 such that a portion of the neighboring current collector 34 is exposed. The recess 36 is located such that when the composite electrode and neighboring electrode 28 are arranged in a stack, the reference electrode is positioned on the opposite side of the separator 30 from the recess 36 in the neighboring composite electrode. Accordingly, the reference electrode is located between the current collector 12 and the bottom of the recess 36.

If the recess 36 were not present and neighboring active medium 32 was present between the reference electrode and the neighboring current collector 34, lithium metal could deposit on the reference electrode or on the working electrode. Formation of this lithium metal in either of these locations could result in a catastrophic accident.

FIG. 5A through FIG. 5C illustrate an electrode assembly that includes a composite electrode. FIG. 5A is a topview of the electrode assembly. FIG. 5B is a cross section of the electrode assembly shown in FIG. 5A taken along the line labeled B. FIG. 5C is a cross section of the electrode assembly shown in FIG. 5A taken along the line labeled C.

The electrode assembly includes a stack of electrodes that includes positive electrodes 37 alternated with negative electrodes 38. The stack of electrodes also includes a composite electrode 39 constructed according to FIG. 3A through FIG. 3D. The working electrode included in the composite electrode is a positive electrode. The interface between the reference electrode and the neighboring electrode 28 is constructed as shown in FIG. 4A through FIG. 4C. The current collector 12 in the electrodes of FIG. 5A through FIG. 5C can be constructed according to FIG. 1A through FIG. 1D or FIG. 2A through FIG. 2D.

As evident in FIG. 5C, the electrode assembly can include electrical connectors A first electrical connector 40 contacts the current collector 12 of the positive electrodes 37 and a second electrical connector 42 contacts the current collector 12 of the negative electrodes 38. The first electrical connector 40 and the second electrical connector 42 are each electrically conducting. For instance, the first electrical connector 40 includes a first lead 44 and provides electrical communication between the positive electrodes and the first lead 44 and a second electrical connector 42 includes a first lead 44 and provides electrical communication between the negative electrodes and the first lead 44. Each of the first leads 44 can optionally serve as a terminal for the battery or can provide electrical communication between a terminal and the electrode assembly.

The first electrical connector 40 and/or the second electrical connector 42 can be crimped in order to effectively press different current collectors 12 together so they contact one another. Alternately, the first electrical connector 40 and/or the second electrical connector 42 can be a clamp or clip that in order to effectively press different current collectors 12 together so they contact one another. Constructing an electrical connector such that the electrical connector presses different current collectors 12 together can enhance the electrical connections within the electrode assembly and can stabilize the electrical connector relative to the stack of electrodes.

In addition to, or as an alternative to, construction of an electrical connector such that the electrical connector presses different current collectors 12 together, an electrical conductor 46 can extend through openings in the current collectors 12 as illustrated in FIG. 5D. All or a portion of the openings can surround an electrical conductor 46. The electrical conductors 46 can also be in electrical communication with the electrical connector. As a result, an electrical connector can provide electrical communication between the electrodes and the electrical connector. Suitable electrical conductors 46 include, but are not limited to, rivets. In addition to providing electrical connections, the electrical conductors 46 can stabilize the positions of the electrodes relative to one another in the stack.

As shown in FIG. 5E, one or more of the first leads 44 can optionally be attached to a second lead 48 such that the second lead 48 is in electrical communication with the first lead 44. The second leads 38 can be electrically conducting and can serve as the terminal for the battery. Suitable methods for connecting the first lead 44 and the second lead 48 include, but are not limited to, adhesives and welds such as a sonic weld.

As shown in FIG. 5F, in some instances, the first electrical connector 40 and/or the second electrical connector 42 exclude the first lead 44. In these instances, a second lead 48 can optionally be attached to directly to an electrical connector such that the second lead 48 is in electrical communication with the electrical connector. The second leads 38 can electrically conducting and can serve as the terminal for the battery. Suitable methods for connecting the electrical connector and the second lead 48 include, but are not limited to, adhesives and welding such as sonic welding.

The electrical connectors and/or electrical conductor 46 can be constructed of electrically conductive materials including metals such as nickel, aluminum, copper, stainless steel, titanium and alloys that include one or more of these metals. An electrical connector and/or electrical conductor 46 in electrical communication with one or more positive electrodes can be constructed of a different material than an electrical connector and/or electrical conductor 46 in electrical communication with one or more negative electrodes. For instance, an electrical connector and/or electrical conductor 46 in electrical communication with one or more positive electrodes can be constructed of aluminum and an electrical connector and/or electrical conductor 46 in electrical communication with one or more negative electrodes can be constructed of nickel.

FIG. 6A through FIG. 6C illustrate a battery including the electrode assembly of FIG. 5A through FIG. 5C. In particular, FIG. 6A through FIG. 6B illustrate the electrode assembly of FIG. 5A through FIG. 5C included in a pouch cell. FIG. 6A is a topview of the electrode assembly. FIG. 6B is a cross section of the electrode assembly shown in FIG. 6A taken along the line labeled C. FIG. 6C is a cross section of the electrode assembly shown in FIG. 6A taken along the line labeled B.

The pouch 50 serves as a case for the battery and includes one or more seams 52 where different portions of the pouch 50 are attached to one another. In certain locations a first lead 44, a second lead 48, or a tab extends through a seam 52 in the pouch 50. The portion of each first lead 44, second lead 48, or tab that is accessible from outside of the pouch 50 can serve as a terminal for the battery. Accordingly, the illustrated battery has three terminals. One of the terminals provides electrical communication with the one or more reference electrodes in the battery, another terminal provides electrical communication with the one or more positive electrodes in the battery, and another terminal provides electrical communication with the one or more negative electrodes in the battery.

In some instances, there is more than one composite electrode included in a stack of electrode. Where there is more than one composite electrode included in a stack of electrode, each of the reference electrodes can be in electrical communication with a different terminal or multiple reference electrodes can be in electrical communication with one terminal.

In the locations where a first lead 44, a second lead 48, or a tab extends through a seam 52 in the pouch 50, a sealant 54 can be located between the pouch 50 and the first lead 44 or second lead 48. The sealant 54 can prevent or reduce leakage of a liquid electrolyte from within the pouch cell. Suitable materials for the sealant 54 include, but are not limited to, polyethylene, polypropylene, and co-polymers of these materials.

The pouch 50 can include one or more layers. In one example, the pouch 50 includes a base layer between a protective layer and a sealant 54 layer. Suitable materials for the base layer include, metals such as aluminum, copper, stainless steel, titanium. Suitable materials for the protective layer include, but are not limited to, nylon and polyester. Suitable materials for the sealant 54 layer include, but are not limited to, sealant 54 such as polyethylene, polypropylene, and co-polymers of these materials.

The pouch 50 is folded such that the sealant 54 layer is on an interior of the cell. The seams 52 can be formed by heating regions of the pouch 50 such that the sealants 54 in the one or more seams 52 bond to one another. For instance, one or more seams 52 can be formed by heating regions of the pouch 50 such that the sealant 54 layer on opposing side of the seam 52 bond to one another and/or such that the sealant 54 bonds to the sealant 54 layer.

Although FIG. 6A through FIG. 6C illustrate an electrode assembly having multiple positive electrodes and multiple negative electrodes, the electrode assembly can have one or more positive electrodes and one or more negative electrodes.

The pouch 50 can contain an electrolyte that activates the one or more anodes and one or more cathodes. Suitable electrolytes include, but are not limited to, liquids, gels, and solids. Suitable liquid electrolytes include, but are not limited to, one or more salts dissolved in one or more solvents. Suitable salts for use with the electrolyte include, but are not limited to, alkali metal salts including lithium salts. Examples of lithium salts include $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, Li-methide, Li-imide, lithium alkyl fluorophosphates, lithium organoborate salts and mixtures thereof. Suitable solvents include, but are not limited to, siloxanes, silane, organic solvents and mixtures of these. Suitable organic solvents include cyclic carbonates such as propylene carbonate (PC), ethylene carbonate (EC), butylene carbonate (BC) and vinylene carbonate (VC), linear carbonates such as dimethyl carbonate (DMC), diethyl carbonate (DEC), ethylmethyl carbonate (EMC) and dipropyl carbonate (DPC), aliphatic carboxylate esters such as methyl formate, methyl acetate and ethyl propionate, .gamma.-lactones such as .gamma.-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters.

In some instances, the battery needs to be activated before use. For instance, when the reference electrode includes lithium titanate as a reference active material, the reference electrode may need to be activated before use. A reference electrode that includes lithium titanate as a reference active material can be activated by applying a potential between the one or more reference electrodes and the one or more positive electrodes in the battery. Through this activation, the reference electrode can achieve a stable potential. For example, the result can then be charged to a 100% state of charge followed by a discharge to a 75% state of charge.

Figure 7A:
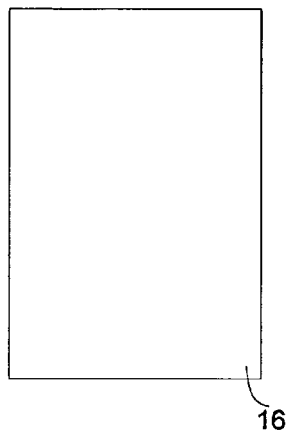
Figure 7B:
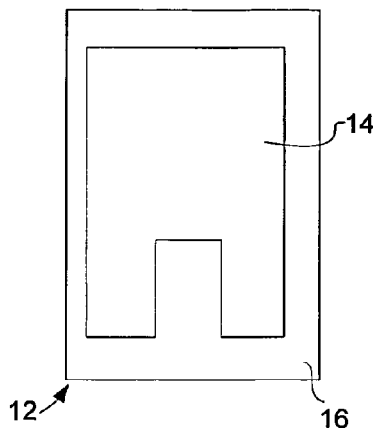

FIG. 7A through FIG. 7F illustrate a method of forming a composite electrode according to FIG. 1A through FIG. 1D. FIG. 7A illustrates a face of a collector support 16. The collector layer 14 is patterned on the collector support 16 as shown in FIG. 7B. The collector layer 14 is patterned to include a reference electrode region where the reference electrode will be positioned.

The collector layer 14 can be formed on the collector support 16 by printing technique such as ink jet printing, thermal transfer printing, offset and silk-screen printing. Ink-jet printing includes spraying fine drops of ink onto the collector support 16. In some instances, these droplets can are "ionized" which allows them to be directed by magnetic plates in the ink's path. Screen printing is a printing technique that uses a woven mesh to support an ink-blocking stencil. The attached stencil forms open areas of mesh that transfer ink as a sharp-edged image onto a substrate. A roller or squeegee is moved across the screen stencil, forcing or pumping ink past the threads of the woven mesh in the open areas. Screen printing is also a stencil method of print making in which a design is imposed on a screen of silk or other fine mesh, with blank areas coated with an impermeable substance, and ink is forced through the mesh onto the printing surface. It is also known as silk screening or serigraphy. Other printing examples include blade coating followed by laser ablation in order to pattern the coating. Alternately, the coating can be placed on a masked surface. The resulting pattern can be a result of the mask pattern. Suitable masks include, but are not limited to, masking tape.

Figure 7C:
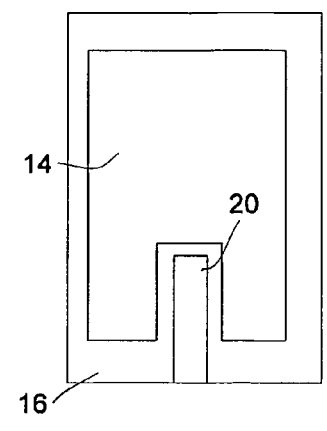

FIG. 7C illustrates the reference current collector 20 patterned on the collector support 16. The reference current collector 20 can be the same material as the collector layer 14 and can be formed on the collector support 16 suing the same method used to form the collector layer 14 on the collector support 16. For instance, the reference current collector 20 can be printed on the collector support 16. The width of the reference current collector 20 can range from 0.001 to 20 mm or wider and/or the length of the reference current collector can range from 0.001 to 20 mm or longer. In some instances, the width of the reference current collector 20 can be up to the same width as the collector support 16 and/or the length of the reference current collector 20 can be up to the length of the collector support 16. The area, size, and the shape of the reference current collector 20 are not necessarily restricted but the reference current collector preferably does not reduce the available capacity of the battery more than 10% or more preferably 1% of the battery capacity that the same battery would have without the reference current collector(s).

Figure 7D:
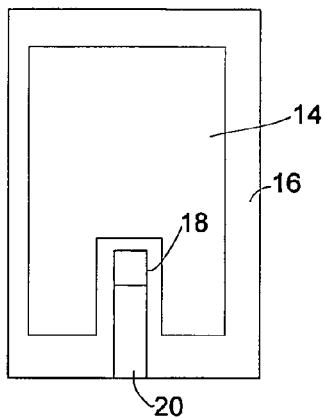

FIG. 7D illustrates the reference active medium 18 formed on the reference current collector 20 so as to form the reference electrode. The reference active medium 18 can be formed on the reference current collector 20 by placing the reference slurry on the reference current collector 20 and drying the reference slurry.

Figure 7E:
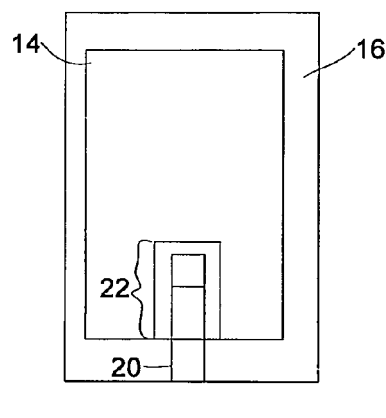

In cases where it is desirable for the reference electrode to include the reference separator material 22, the reference separator material 22 can be included in the reference electrode as shown in FIG. 7E. The reference separator material 22 can be formed by placing the separator slurry in the desired location and drying the separator slurry.

Figure 7F:
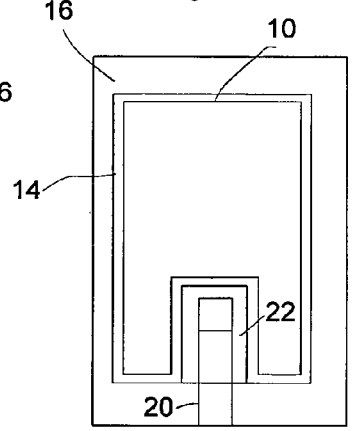

The composite electrode is formed as shown in FIG. 7F. For instance, the active medium 10 is formed on the collector layer 14 and patterned as shown in FIG. 7F. The active medium 10 is formed to have a thickness that results in the top surface of the active medium 10 being about the same distance from the collector support 16 as the top surface of the reference electrode. For instance, the positive slurry or negative slurry can be positioned on the collector layer 14 and dried so as to form the active medium 10. The desired thickness can be achieved by controlling amount of the slurry deposited on the collector layer 14. For example, a gap of a blade can be adjusted in a doctor blade coating to achieve the desired thickness. The distance of the top surface of the active medium 10 from the collector support 16 is preferably equal to the distance of the top surface of the reference electrode form the collector support 16+/−10% and more preferably +/−1%. Any undesired active medium 10 can be removed using physical methods such as scraping or methods that do not require contact such as laser ablation.

Figure 8A:
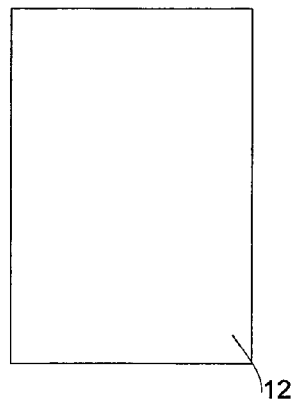

FIG. 8A through FIG. 8E illustrate a method of forming a composite electrode according to FIG. 2A through FIG. 2D. FIG. 8A illustrates a face of a current collector 12 that can be a substrate or foil of an electrically conducting material such as a metal or can be a collector support 16 covered by the collector layer 14.

Figure 8B:
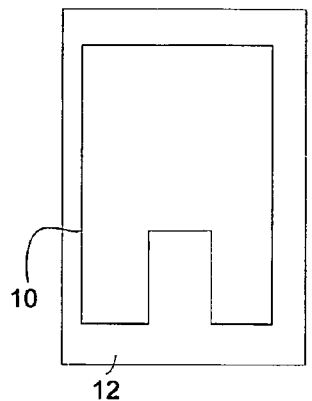

FIG. 8B illustrates the active medium 10 patterned on the current collector 12. The active medium 10 is patterned to define a reference electrode region where the reference electrode will be positioned on the current collector 12. The active medium 10 can be patterned on the current collector 12 or can be formed on the current collector 12 without a pattern. When the active medium 10 is formed without a pattern, the pattern can be formed by removing undesired active medium 10 using physical methods such as scraping or methods that do not require contact such as laser ablation. In one example, the active medium 10 is formed on the current collector 12 by placing the positive slurry or negative slurry on the current collector 12 and drying so as to form the active medium 10. The portion of the active medium 10 over the region where the reference electrode is to be formed is then removed. In some instances, the active medium 10 has a thickness of about 10 to 500 μm.

Figure 8C:
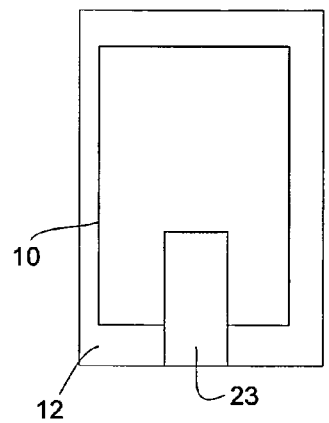

FIG. 8C illustrates the electric insulator 23 formed on the current collector 12 in the region where the reference electrode is to be formed. The electric insulator 23 can be formed on the current collector 12 by coating a slurry of insulator 23 by printing technique described above, or through the use of an insulator 23 film with adhesive backing.

Figure 8D:
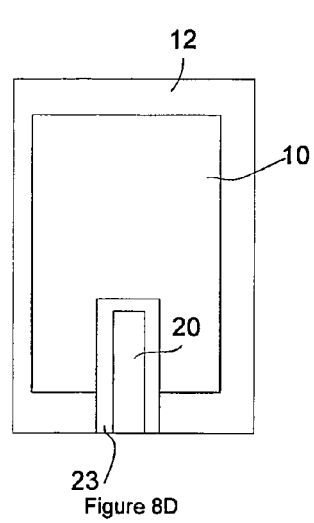

FIG. 8D illustrates the reference current collector 20 patterned on the electric insulator 23. The reference current collector 20 can be the same material as the collector layer 14 discussed above. Accordingly, the reference current collector 20 can be formed on the electric insulator 23 using the same methods disclosed for forming a collector layer 14 on a collector support 16. For instance, the reference current collector 20 can be printed on the electric insulator 23. The width of the reference current collector 20 can range from 0.001 to 20 mm or wider and/or the length of the reference current collector can range from 0.001 to 20 mm or longer. In some instances, the width of the reference current collector 20 can be up to the same width as the collector support 16 and/or the length of the reference current collector 20 can be up to the length of the collector support 16. The area, size, and the shape of the reference current collector 20 are not necessarily restricted but the reference current collector preferably does not reduce the available capacity of the battery more than 10% or more preferably 1% of the battery capacity that the same battery would have without the reference current collector(s).

Figure 8E:
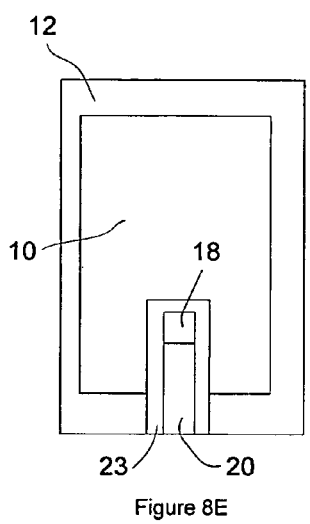

FIG. 8E illustrates the reference active medium 18 formed on the reference current collector 20 so as to form the reference electrode. The reference active medium 18 can be formed on the reference current collector 20 by placing the reference slurry on the reference current collector 20 and drying the reference slurry. When the reference electrode will not include the reference separator material 22, the reference active medium 18 can be formed on the reference current collector 20 with a thickness such that the distance of the top surface of the reference electrode from the current collector 12 is about the same as the distance of the top surface of the active medium 10 from the current collector 12. The distance of the top surface of the active medium 10 from the current collector 12 is preferably equal to the distance of the top surface of the reference active material from the current collector 12+/−10% and more preferably +/−1%. The desired thickness of the reference active medium 18 can be achieved by controlling amount of the slurry deposited. For example, a gap of a blade can be adjusted in a doctor blade coating to achieve the desired thickness.

When the reference electrode will include the reference separator material 22, the reference active medium 18 can be formed on the reference current collector 20 with a thickness such that the distance of the top surface of the reference active medium 18 from the current collector 12 is less than the distance of the top surface of the active medium 10 from the current collector 12. The reference separator material 22 can then be formed on the reference active medium 18 such that the distance of the top surface of the reference separator material 22 from the current collector 12 is about the same as the distance of the top surface of the active medium 10 from the current collector 12. The distance of the top surface of the reference separator material 22 from the current collector 12 is preferably equal to the distance of the top surface of active medium 10 from the current collector 12+/−10% and more preferably +/−1%. The reference separator material 22 can be formed on the reference active medium 18 by placing the separator slurry on the reference active medium 18 and drying the separator slurry. The desired thickness of the reference separator material 22 can be achieved by controlling amount of the slurry deposited. For example, a gap of a blade can be adjusted in a doctor blade coating to achieve the desired thickness.

Figure 9A:
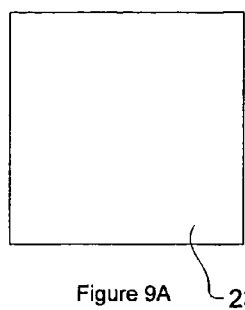
Figure 9B:
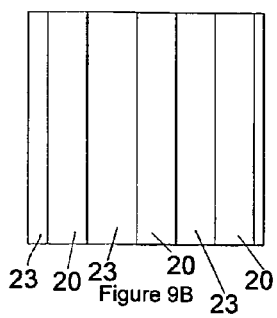

FIG. 9A through FIG. 9G illustrate a method of forming a composite electrode according to FIG. 3A through FIG. 3D. FIG. 9A illustrates a face of an electric insulator 23. FIG. 9B illustrates the reference current collector 20 patterned on the electric insulator 23. The reference current collector 20 can be the same material as the collector layer 14 discussed above. Accordingly, the reference current collector 20 can be formed on the electric insulator 23 using the same methods disclosed for forming a collector layer 14 on a collector support 16. For instance, the reference current collector 20 can be printed on the electric insulator 23. In some instances, the width of the reference current collector 20 ranges from 0.001 to 20 mm. In some instances, the width of the reference current collector 20 can be up to the same width as the collector support 16 and/or the length of the reference current collector 20 can be up to the length of the collector support 16. The area, size, and the shape of the reference current collector 20 are not necessarily restricted but the reference current collector preferably does not reduce the available capacity of the battery more than 10% or more preferably 1% of the battery capacity that the same battery would have without the reference current collector(s). The current collector 20 can be also formed by using sputtering technique.

Figure 9C:
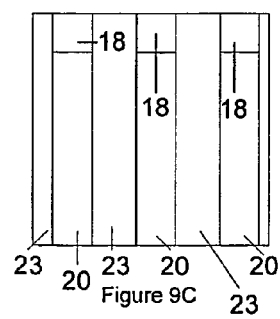
Figure 9D:
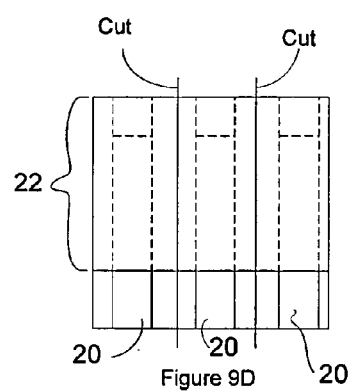

FIG. 9C illustrates the reference active medium 18 formed on the reference current collector 20. The reference active medium 18 can be formed on the reference current collector 20 by placing the reference slurry on the reference current collector 20 and drying the reference slurry. When the reference electrode will include the reference separator material 22, the reference separator material 22 can be formed on the reference active medium 18 as shown in FIG. 9D. In FIG. 9D, the dashed lines indicate the components located under the reference separator material 22. The reference separator material 22 can be formed on the reference active medium 18 by placing the separator slurry on the reference active medium 18 and drying the separator slurry.

The device of FIG. 9C includes three different reference electrodes. The reference electrodes can be separated from one another along the lines labeled cut in FIG. 9D in order to provide a component having a single reference electrode as shown in FIG. 9E.

Figure 9E:
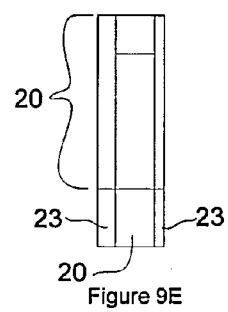
Figure 9E:
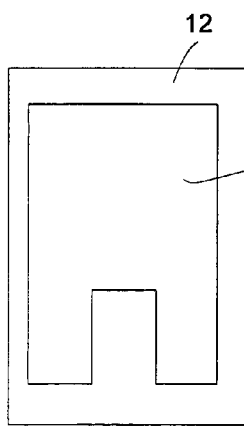
Figure 9F:
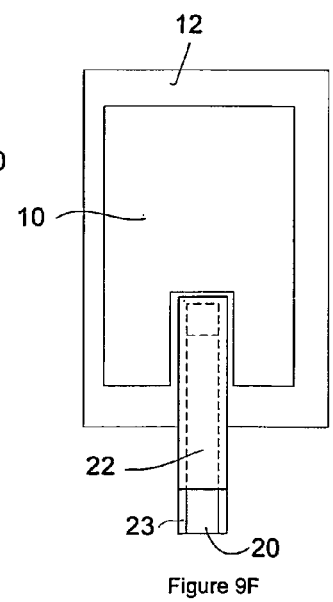

FIG. 9E illustrates the active medium 10 patterned on the current collector 12. The active medium 10 can be patterned on the current collector 12 as described in the context of FIG. 8B. In some instances, the active medium 10 has a thickness of about 10 to 500 μm. The active medium 10 is patterned to define a reference electrode region where the reference electrode will be positioned on the current collector 12. The current collector 12 of FIG. 9E can be attached to the reference electrode region of the current collector 12 as shown in FIG. 9F. For instance, an adhesive can be placed on the electric insulator 23 and/or the electric insulator 23 can have an adhesive backing. The adhesive can immobilize the reference electrode relative to the current collector 12. Suitable adhesives include, but are not limited to, acrylic resin, epoxy resin, cyanurate resin, cyanate resin. The thickness of active medium relative to the reference electrode can be controlled by selecting the electric insulator 23 and/or reference separator material 22 with the desired thickness and/or by controlling thickness of the reference active medium 18.

Figure 9G:
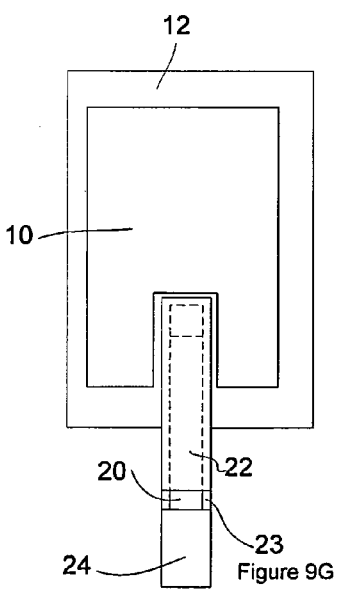

An electrode tab 24 can be connected to the reference current collectors 20 as shown in FIG. 9G. The electrode tab 24 can be connected to the reference current collector 20 using adhesives and/or a weld such as a sonic weld.

Although FIG. 9A through FIG. 9G discuss the formation of only one side of the composite electrode, each of the disclosed method can be employed to form a working electrode and reference electrode on both sides of the composite electrode. Alternately, the side of the composite electrode opposite the reference electrode can exclude both the active medium and the reference electrode. Alternately, the side of the composite electrode opposite the reference electrode can include a layer of the active medium but exclude the reference electrode as shown in FIG. 1A through FIG. 3D.

As is evident from FIG. 4A through FIG. 6C, the electrode stack can include electrodes in addition to a composite electrode. For instance, the electrode stack can include positive electrodes and negative electrodes that exclude a reference electrode. These positive electrodes can be formed by using disclosed methods for forming a positive active material on one or both sides of a current collector 12. These negative electrodes can be formed by using disclosed methods for forming a negative active material on one or both sides of a current collector 12. The neighboring electrode 28 to the composite electrode can be formed using the same methods as used to form one of these positive electrodes or negative electrodes but active medium can be removed from the electrode so as to define the recess 36. The active medium can be removed using physical methods such as scraping or methods that do not require physical contact with the electrode such as laser ablation. There could be more than one composite electrode. Each electrode could be connected to one terminal or multiple composite electrode could share one terminal.

Example 1

Composite electrodes were prepared with the working electrode being a negative electrode. A slurry was generated from a mixture and 1-methyl-2-pyrrolidinone. The mixture included 91.5 wt % Mesocarbon Micro Beads (MCMB), 0.5 wt % acetylene black 0.5%, and 8 wt % polyvinylidene fluoride. The slurry was spread on a copper foil current collector with thickness of 12 μm. The slurry thickness is adjusted to 100 μm. The slurry was dried in air at 80° C. for 1 h and at 110° C. in vacuum in order to form the negative active medium. The electrode was cut to 45 mm×90 mm. The negative active medium was scraped off so as to define a 3 mm×5 mm rectangular reference electrode region on the current collector.

Positive electrodes were prepared. A positive slurry was prepared from a mixture and 1-methyl-2-pyrrolidinone. The mixture included 91 wt % Lithium cobalt oxide, 6 wt % acetylene black, and 3 wt % polyvinylidene fluoride 3%. The slurry was spread on an aluminum foil current collector having a thickness of 20 μm. The slurry thickness is adjusted to 100 μm. The positive slurry is dried in air at 80° C. for 1 h and at 110° C. in vacuum so as to form the positive active medium. The electrode is cut to 44 mm×89 mm. The positive active medium was scraped off so as to define a 3 mm×5 mm rectangular recess on the current collector. The recess was positioned such that when the positive electrode is stacked with the composite electrode, the recess is aligned with the reference electrode region of the composite electrode.

The reference electrodes were prepared as disclosed in the context of FIG. 9A through FIG. 9E. The electric insulator was a polyimide film with an adhesive backing. The reference current collector was gold and was patterned on the electric insulator by sputtering. The reference slurry was prepared by mixing 84% of LTO with 8% of PVDf and 8% of carbon black. The reference active medium was then formed on the reference current collector by screen printing. The separator slurry was a suspension of PTFE in water. The reference separator material was then formed on the reference active medium by dipping the reference electrode in the separator suspension. The adhesive on polyimide was used to attach the resulting reference electrode to the reference electrode region of the composite electrode.

Fifty of the electrodes were then stocked on top of one another with the positive electrodes being alternated with the composite electrodes. The reference electrode on each of the composite electrode Was aligned with the recess in the neighboring positive electrode. Additionally, a 16 μm Tonen separator Tonen was positioned between each of the composite electrodes and the neighboring positive electrode.

A nickel electrical connector was connected to the current collector of the negative electrodes. An aluminum electrical connector was connected to the current collector of the positive electrodes. A nickel second lead with a plastic sealant was sonic-welded to the nickel electrical connector. An aluminum second lead with the plastic sealant was sonic-welded to the aluminum electrical connector. A nickel electrode tab with a plastic sealant was adhesively attached to the reference current collector.

The electrode assembly was packaged in a pouch sheet that has a base layer between a protective layer and a sealant layer. The seams through which the second leads and electrode tab extend were heat sealed leaving another seam unsealed.

An electrode laws generated having $LiPF_6$ dissolved in a mixture of ethylene carbonate and diethyl carbonate. The electrolyte was poured into the pouch through the open seam. The pouch was put in a vacuum chamber and degassed. Then, the open seam was heat sealed under vacuum.

Although the battery is disclosed in the context of a battery having stacked electrodes, the composite electrode can also be used in rolled batteries such as jelly-role batteries. For instance, the electrode assembly of FIG. 4C can be rolled.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery, comprising:
  a composite electrode having,
    a working electrode that includes a current collector,
    a reference electrode on the current collector, the reference electrode including a reference active medium on a reference current collector that is electrically insulated from the current collector, and
    a top surface of the reference electrode being flush with a top surface of the working electrode in that the top surface of the reference electrode and the top surface of the working electrode are the same distance from the current collector, the top surface of the reference electrode being a surface of the reference electrode that is furthest from the current collector.

2. The battery of claim 1, wherein a neighboring electrode is positioned adjacent to the composite electrode such that no other electrodes are positioned between the neighboring electrode and the composite electrode and such that the reference electrode is positioned between the current collector and the neighboring electrode,
  the neighboring electrode includes a neighboring active material on a neighboring current collector such that the neighboring active material is between the neighboring current collector and the composite electrode,
  and the neighboring active material is arranged such that a line that is perpendicular to the top surface of the reference electrode can extend from the top surface of the reference electrode to the neighboring current collector without passing through the neighboring active material.

3. The battery of claim 1, wherein a neighboring electrode is positioned adjacent to the composite electrode such that no other electrodes are positioned between the neighboring electrode and the composite electrode and such that the reference electrode is positioned between the current collector and the neighboring electrode,
  the neighboring electrode includes a neighboring active material on a neighboring current collector such that the neighboring active material is between the neighboring current collector and the working electrode,
  the neighboring active material being arranged such that a line that is perpendicular to the upper surface of the reference electrode can extend from the reference electrode to the neighboring current collector without passing through the neighboring active material.

4. The battery of claim 1, wherein a neighboring electrode is positioned adjacent to the composite electrode such that no other electrodes are positioned between the neighboring electrode and the composite electrode and such that the reference electrode is positioned between the current collector and the neighboring electrode,
  the neighboring electrode includes a neighboring active material on a neighboring current collector such that the neighboring active material is between the neighboring current collector and the working electrode,
  the neighboring active material being arranged such that a line that is perpendicular to an upper surface of the reference active material can extend from the reference active material to the neighboring current collector without passing through the neighboring active material,
  the top surface of the reference active material being a surface of the reference active material that is furthest from the current collector.

5. The battery of claim 1, wherein the current collector includes an electrically conducting collector layer patterned on an electrically insulating collector support.

6. The battery of claim 5, wherein the reference electrode includes a reference current collector patterned on the collector support and the reference current collector is constructed of the same material as the collector layer.

7. The battery of claim 6, wherein the collector layer includes carbon nanotubes.

8. The battery of claim 5, wherein the collector layer is patterned in accordance with printing of the collector layer on the collector support.

9. The battery of claim 1, wherein the current collector is an electrically conducting foil or substrate having one or more layers that are each electrically conducting.

10. The battery of claim 9, wherein an electric insulator is located between the current collector and the reference current collector.

11. The battery of claim 1, wherein the reference active medium includes lithium titanate ($Li_4Ti_5O_{12}$).

12. A battery, comprising: a composite electrode having, a working electrode that includes a working current collector, and a reference electrode on the working current collector, the reference electrode including a reference active medium and a reference current collector, wherein the reference current collector is electrically insulated from the working current collector; and a neighboring electrode positioned adjacent to the composite electrode such that no other electrodes are positioned between the neighboring electrode and the composite electrode and such that the reference electrode is positioned between the working current collector and the neighboring electrode, the neighboring electrode includes a neighboring active material on a neighboring current collector such that the neighboring active material is between the neighboring current collector and the working electrode, the neighboring active material is arranged such that a line that is perpendicular to the a top surface of the reference active material can extend from the top surface of the reference electrode to the neighboring current collector without passing through the neighboring active material, the top surface of the reference electrode being a surface of the reference electrode that is furthest from the working current collector.

13. The battery of claim 1, wherein the reference electrode is immobilized relative to the working electrode.

14. The battery of claim 1, wherein the reference electrode is immobilized relative to the working electrode before the assembly of the battery.

15. The battery of claim 1, wherein the top surface of the reference electrode is the same distance from the current collector as a distance of the top surface of the working electrode from the current collector.

16. The battery of claim 1, wherein the reference electrode is immobilized relative to the current collector and the top surface of the reference electrode has a distance from the current collector that is constant and is the same as a distance of the top surface of the working electrode from the current collector.

17. The battery of claim 12, wherein the reference electrode is immobilized relative to the working electrode.

18. The battery of claim 12, wherein the top surface of the reference electrode is the same distance from the working current collector as a distance of the top surface of the working electrode from the working current collector.

19. The battery of claim 12, wherein the reference electrode is immobilized relative to the working current collector and the top surface of the reference electrode has a distance from the working current collector that is constant and is the same as a distance of the top surface of the working electrode from the working current collector.

20. The battery of claim 12, wherein the line can also extend from the top surface of the reference electrode to the working current collector without passing through a separator.

\* \* \* \* \*